United States Patent
Kayama et al.

(10) Patent No.: US 8,254,775 B2
(45) Date of Patent: Aug. 28, 2012

(54) AUTOFOCUS CONTROL METHOD

(75) Inventors: Norio Kayama, Kanagawa (JP); Yue Shen, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 12/984,336

(22) Filed: Jan. 4, 2011

(65) Prior Publication Data

US 2011/0164866 A1    Jul. 7, 2011

(30) Foreign Application Priority Data

Jan. 6, 2010    (JP) ................................. 2010-001210

(51) Int. Cl.
*G03B 3/10*    (2006.01)
*H04N 5/232*    (2006.01)

(52) U.S. Cl. ........................................ 396/123; 348/349

(58) Field of Classification Search .................. 396/123; 348/349, 356

See application file for complete search history.

(56) References Cited

U.S. PATENT DOCUMENTS

| | | | | |
|---|---|---|---|---|
| 5,003,339 A | * | 3/1991 | Kikuchi et al. | 396/100 |
| 2008/0136958 A1 | | 6/2008 | Nakahara | |
| 2009/0207299 A1 | * | 8/2009 | Hori | 348/349 |
| 2010/0097515 A1 | * | 4/2010 | Ishii | 348/349 |

FOREIGN PATENT DOCUMENTS

| | | |
|---|---|---|
| JP | 06-6659 | 1/1994 |
| JP | 2006-208443 | 8/2006 |
| JP | 2007-133301 | 5/2007 |
| JP | 2008-299164 | 12/2008 |

* cited by examiner

*Primary Examiner* — Clayton E LaBalle
*Assistant Examiner* — Noam Reisner
(74) *Attorney, Agent, or Firm* — Young & Thompson

(57) ABSTRACT

A ring-like region excluding a central region and a peripheral region from an image pickup area is preset as a focus area. An image signal is acquired through a lens and a CCD circuit. Based on the image signal thus acquired, a contrast value indicating the degree of in-focus of the preset focus area is calculated. A lens position corresponding to a maximum contrast value of the preset focus area is determined as an in-focus lens position. In autofocus processing, face detection is carried out first. Then, if the result of face detection is successful, a face region is set up as a focus area, and focus adjustment is performed based thereon. Alternatively, if the result of face detection is unsuccessful, focus adjustment is performed based on the preset focus area.

9 Claims, 18 Drawing Sheets

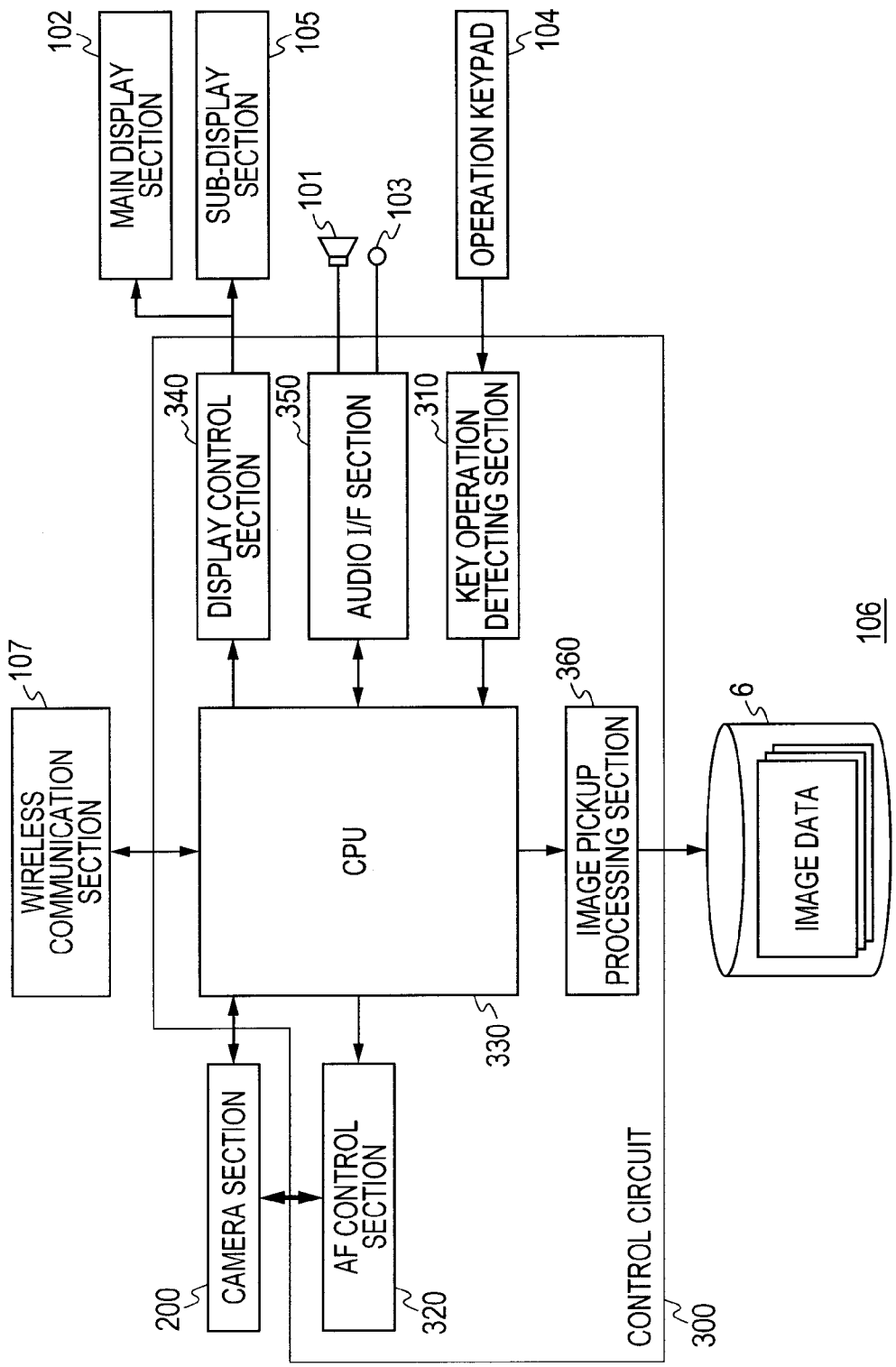

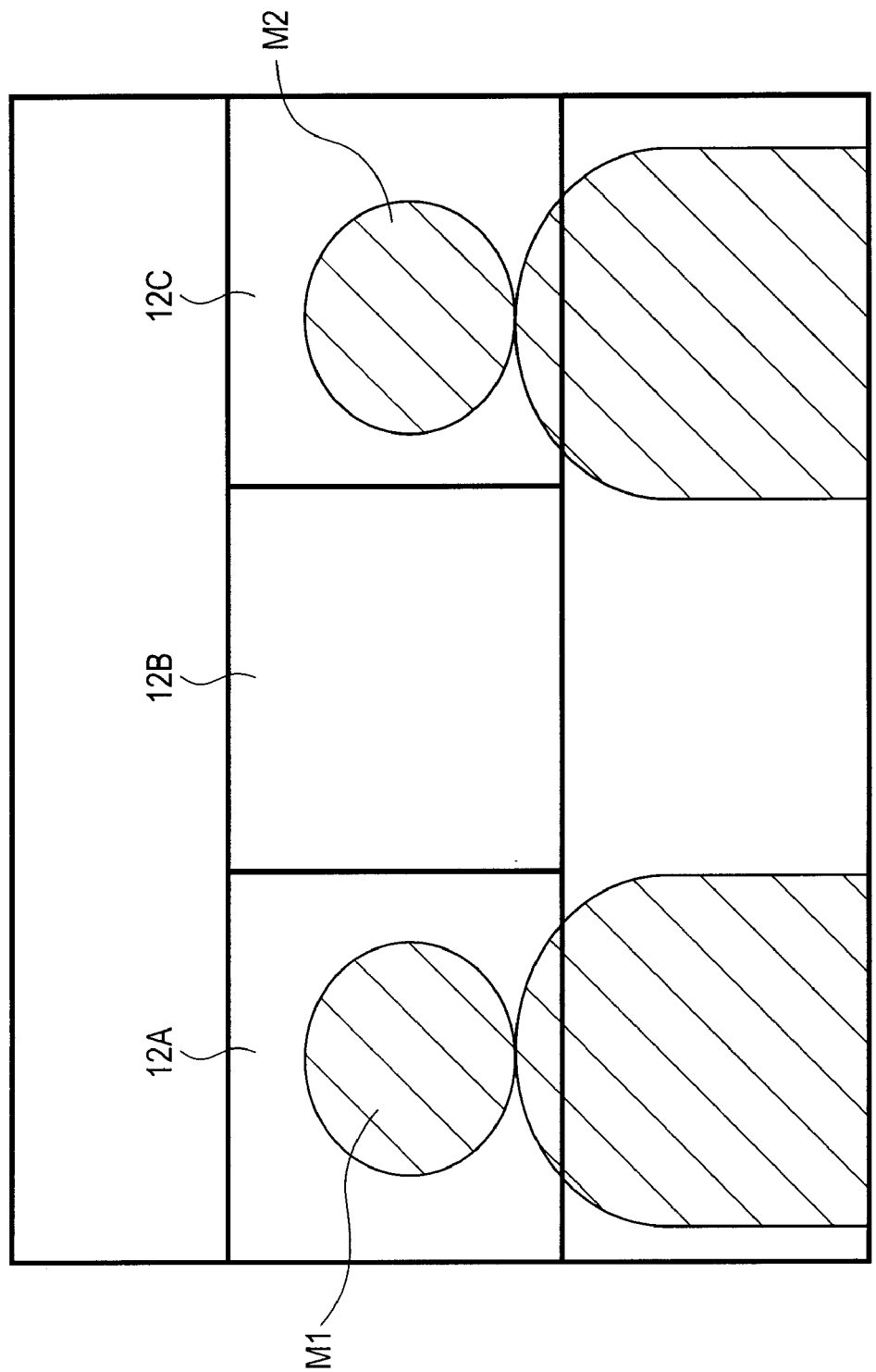

AUTOFOCUS CONTROL METHOD

CROSS-REFERENCE TO RELATED APPLICATIONS

The disclosure of Japanese Patent Application No. 2010-1210 filed on Jan. 6, 2010 including the specification, drawings and abstract is incorporated herein by reference in its entirety.

BACKGROUND

1. Field of the Invention

The present invention relates to an autofocus control method for carrying out focus adjustment automatically in an image pickup device.

2. Description of Related Art

Recent years have seen the increasing prevalence of mobile telephones having camera functions, i.e., camera-equipped mobile phones. Since a camera device incorporated in such a mobile phone is required to allow easy shooting, an autofocus function is provided therein in common design. In shooting operation of a camera-equipped mobile phone, when a user orients a camera lens thereof to the subject of interest in a scene, focus adjustment is carried out automatically. Then, pressing a shutter button thereof enables the user to obtain image data with the subject of interest being in focus.

In execution of automatic focus adjustment, a moving lens is shifted continuously or intermittently. More specifically, at certain time intervals, high-frequency components are extracted from a luminance signal of an image formed on an image sensor through the lens, and these high-frequency components thus extracted are subjected to numerical integration with respect to the entire image pickup area. Thus, an average contrast value of the image on the entire image pickup area is obtained, and the lens position is fine-adjusted to maximize the contrast value. In this manner, the best focus position is determined through automatic focus adjustment.

The above-mentioned arrangement for automatic focus adjustment is based on the conventional image sensor (CCD/CMOS) design condition that the number of pixels in an image sensor is relatively small due to a relatively low degree of circuit integration density. Thus, it has been allowed to attain a satisfactory level of autofocus performance through contrast value evaluation on the entire image pickup area.

With recent rapid advances in image sensor (CCD/CMOS) technology, the number of pixels in an image sensor has been increased significantly, and it has been desired to provide a further advanced function for automatic focus adjustment that is available through an easy shooting procedure. To meet such a demand, a camera having a face detecting function has been proposed in Japanese Unexamined Patent Publication No. 2006-208443 and Japanese Unexamined Patent Publication No. 2008-299164, for example. In the disclosure of either of these Japanese Unexamined Patent Publication No. 2006-208443 and Japanese Unexamined Patent Publication No. 2008-299164, there is described a technique for focus adjustment wherein a region of a subject person's face in a scene being taken is set up as a focus area 10 as shown in FIG. 15, and an in-focus position is determined based on face image contrast data in lens shifting operation. That is, the subject of interest is recognized automatically, and the lens position is controlled so as to provide an in-focus state in a particular region of the image pickup area concerned as mentioned above. Thus, it is possible to obtain a clear, sharp picture image with the subject of interest being in focus.

However, in a situation where the subject person of interest is backlit or wears a mask/sunglasses, there is a high degree of probability that face detection may fail. On occurrence of a failure in face detection, focus adjustment is performed with respect to the entire image pickup area in common recovery processing, thus resulting in a picture image without focusing on the subject of interest to the user. That is, in shooting the subject person against a distant background, a failure in face detection will cause focus adjustment to be performed optimally with respect to the entire image pickup area regardless of the user's intention to focus on the subject person located at a near position. Consequently, the distant background will be brought into focus to cause blurry imaging of the subject person located at the near position.

In another conventional technique for focus adjustment, based on the presumption that the subject person of interest is located centrally on the image pickup area concerned in most shooting situations, a central region of the image pickup area (central region 11 shown in FIG. 16) is set up as a focus area on occurrence of a failure in face detection. Then, focus adjustment in recovery processing is carried out so as to provide a maximum contrast level on the central region 11. However, in a scene where two persons are standing side by side as shown in FIG. 16, if the central region 11 is set up as a focus area, a distant background is brought into focus while the subject persons of interest are out of focus.

In Japanese Unexamined Patent Publication No. Hei 6(1994)-6659 and Japanese Unexamined Publication No. 2007-133301, for example, there is disclosed a focus control method proposed as a technique for focusing on the subject persons of interest in an attempt to obviate the above-mentioned disadvantages. According to the focus control method disclosed in these documents, a plurality of focus areas 12A, 12B, and 12C are set up on the image pickup area concerned as exemplified in FIG. 17, and lens positions each corresponding to a maximum contrast value are acquired on the focus areas 12A, 12B, and 12C, respectively. Then, one of these lens positions is determined to provide an in-focus state on a particular one of the focus areas. Regarding on which focus area an in-focus state is to be provided in the operation mentioned above, there may be provided an arrangement wherein priorities of focusing are assigned to the focus areas in advance, wherein the subject located at the nearest position is brought into focus, or wherein the user selects a desired focus area while viewing the image pickup area concerned. For example, it is assumed here that, in shooting a scene of persons M1 and M2 standing side by side, the focus areas 12A, 12B, and 12C are set up as shown in FIG. 17. In the exemplary scene shown in FIG. 17, the person M1 on the left-hand side is in the left focus area 12A, and the person M2 on the right-hand side is in the right focus area 12C. There is no subject of interest in the central focus area 12B, i.e., a distant background is in the central focus area 12B. Referring to FIGS. 18A, 18B, and 18C, there are shown relationships of lens positions and contrast values obtained through calculations regarding the focus areas 12A, 12B, and 12C, respectively, under the above condition. On the focus area 12A, a peak of contrast is indicated at a lens position of focusing on the person M1 as shown in FIG. 18A. Similarly, on the focus area 12C, a peak of contrast is indicated at a lens position of focusing on the person M2 as shown in FIG. 18C. On the focus area 12B, a peak of contrast is indicated at a lens position of focusing on the distant background as shown in FIG. 18B. Hence, by shifting the lens position to point P control-wise so as to focus on the subject person located at the nearest position, it is possible to obtain a picture image with the subject persons being in focus. Through use of such a focus control method as mentioned above, the possibility of taking a picture image with the subjects being in focus can be increased positively.

SUMMARY

For implementation of the above-mentioned focus control method, it is required to acquire an in-focus position on each of the focus areas 12A, 12B, and 12C. For acquiring an in-focus position on each of these focus areas 12A, 12B, and 12C, a moving lens must be shifted in a reciprocative fashion, thus causing a requirement for a substantial length of time for reciprocal lens movement. Hence, the user should be motionless while orienting the lens to the subject(s) of interest for a considerably long period of time until completion of focus adjustment. In most practical shooting situations, it is rather difficult for the user to be motionless for a long period of time, and there may also arise a problem of image blurring due to hand jiggling in cases where a long period of time is required for focus adjustment.

It is conceivable that there may be provided a focus control technique wherein, from the focus areas 12A, 12B, and 12C, the user selects a desired focus area corresponding to the subject of interest while viewing the image pickup area concerned for focus area setting. In this technique, since focus adjustment is required only on the focus area selected by the user, a shorter period of time will be taken for focusing operation. However, in cases where the user is required to select a focus area while viewing the image pickup area concerned, a complex shooting procedure must be taken, resulting in an increase in time of shooting operation. Since it is desired that a camera device incorporated in a small-type portable device such as a mobile phone should be designed to allow easy shooting, the above-mentioned focus control technique is not practically applicable.

It is therefore an object of the present invention to provide an autofocus control method that can overcome the problems mentioned above. In accomplishing this object of the present invention and according to one aspect thereof, there is provided an autofocus control method for adjusting a position of a lens to bring the subject of interest into focus, comprising the steps of: providing an arrangement wherein a ring-like region excluding a central region from an image pickup area is set up as a preset focus area for judgment of the degree of in-focus; acquiring an image signal through the lens and an image pickup part; calculating, based on the image signal thus acquired, a contrast value indicating the degree of in-focus of the preset focus area; and determining a lens position corresponding to a maximum contrast value of the preset focus area as an in-focus lens position.

In the configuration mentioned above, the ring-like region excluding the central region from the image pickup area is used as a preset focus area for autofocus control. Focus adjustment is carried out so that a contrast value of the preset focus area will be maximized. Thus, proper focus adjustment can be performed readily on the subject(s) of interest in shooting. That is, either in a scene of one subject person or in a scene of two or more subject persons standing side by side, it is possible to bring the subject person(s) into focus since the preset focus area is substantially occupied by the subject(s) in practical application.

In accordance with the present invention, proper focus adjustment can be carried out through an easy shooting procedure, advantageously over the conventional techniques wherein only a central region is set up as a focus area or the entire image pickup area is used for focus adjustment.

BRIEF DESCRIPTION OF THE DRAWINGS

FIGS. 1A and 1B are diagrams showing the appearance of an example of a camera-equipped mobile phone, in which FIG. 1A is a diagrammatic illustration showing an operation face side thereof, and FIG. 1B is a diagrammatic illustration showing a back face side thereof;

FIG. 2 is a system block diagram of the camera-equipped mobile phone;

FIG. 17 is a diagram showing a state in which a plurality of focus areas are set up in a conventional technique.

DETAILED DESCRIPTION OF THE PREFERRED EMBODIMENTS

The present invention will now be described in detail by way of example with reference to the accompanying drawings.

First Exemplary Embodiment

Figure 1A:
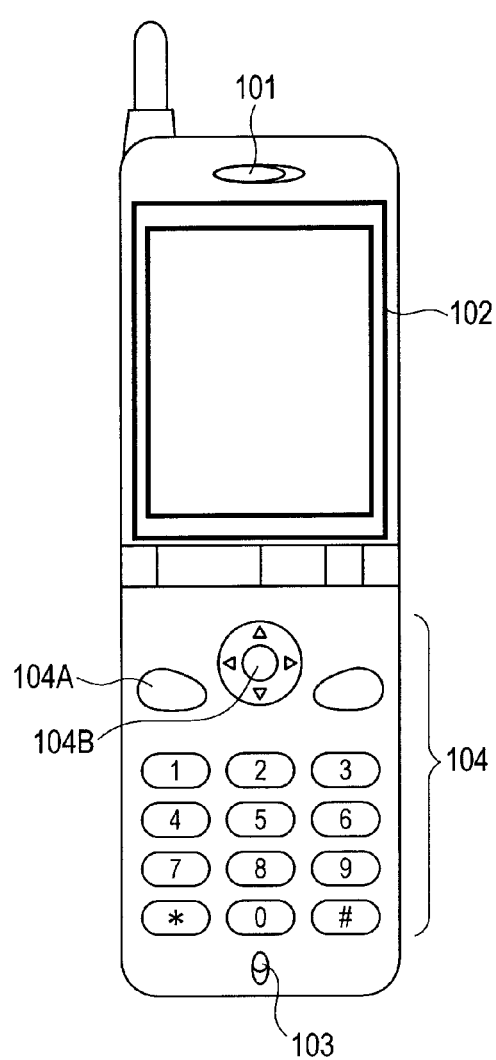
Figure 1B:
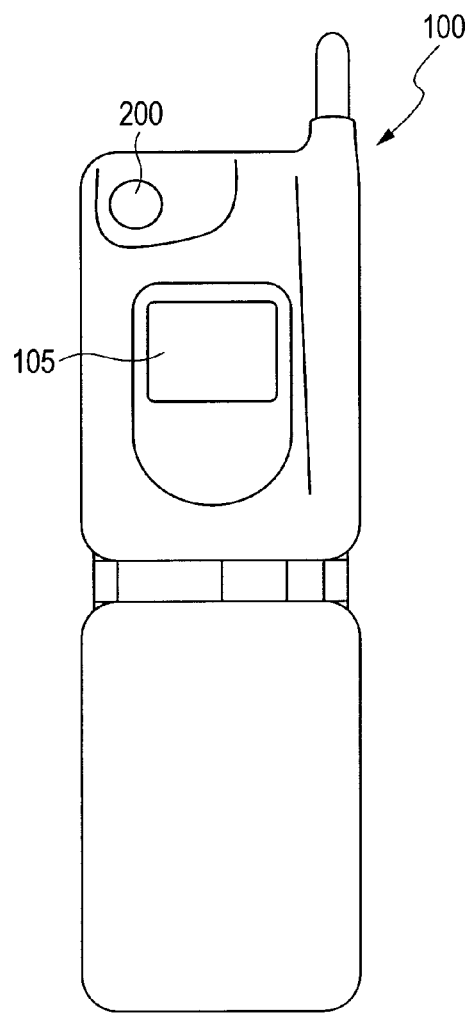

The following describes the details of autofocus control in an exemplary camera-equipped mobile phone according to a first exemplary embodiment of the present invention. FIGS. 1A and 1B show the appearance of a camera-equipped mobile phone 100, and FIG. 2 shows a system block diagram thereof.

The camera-equipped mobile phone 100 comprises a speaker 101 for audio output, a main display section 102 for displaying image information, a microphone 103 for audio input, an operation keypad 104 for operation input, a camera section 200 for image pickup, a sub-display section 105 smaller than the main display section 102, an image data memory section 106, a wireless communication section 107, and a control circuit 300.

The operation keypad 104 comprises a plurality of operation keys; including at least ten-keys, an off-hook key, and an on-hook key that are provided for a communication mode, and further including a camera mode key 104A and a shutter button 104B that are provided for a camera mode. When a user presses the camera mode key 104A, the mobile phone 100 is put in the camera mode. Then, the camera section 200 allows the user to take a picture through the main display section 102 serving as a viewfinder.

Figure 3:
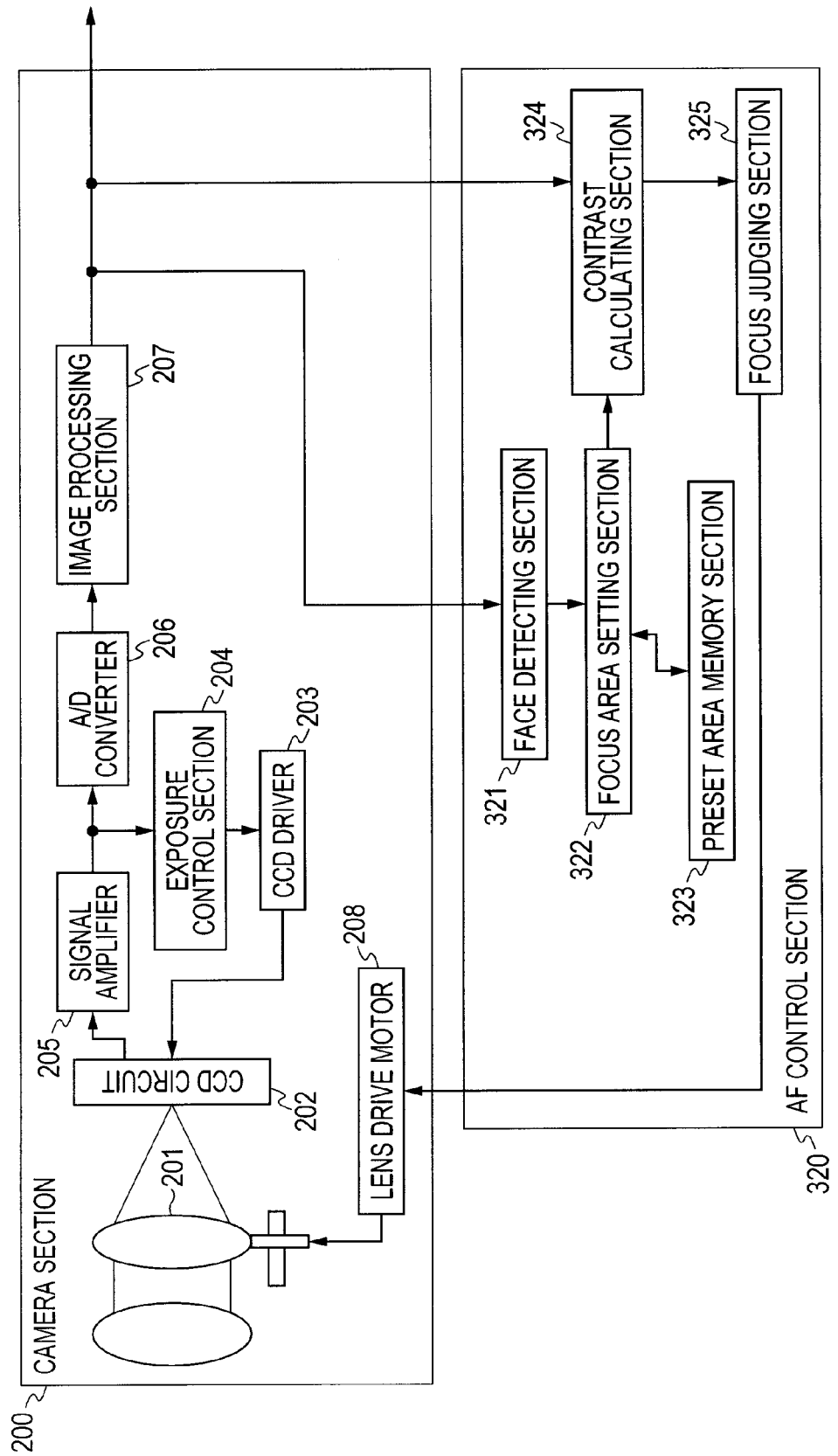
FIG. 3 is a block diagram showing exemplary configurations of a camera section and an AF control section.

The camera section 200 is an image pickup part for taking a picture of a subject and outputting image data thereof. Operations of the camera section 200 are performed under the direction of the control circuit 300. When the mobile phone 100 is in the camera mode, a scene can be taken through use of the camera section 200. The image data of the scene thus taken is output to the control circuit 300. Referring to FIG. 3, there is shown a functional block configuration of the camera section 200. The camera section 200 comprises a moving lens 201, a CCD circuit 202, a CCD driver 203, an exposure control section 204, a signal amplifier 205, an A/D converter 206, an image processing section 207, and a lens drive motor 208. Incident light from a subject is collected through the moving lens 201, and an image thereof is formed on a light receiving face of the CCD circuit 202. The moving lens 201 is so disposed as to be shiftable in the optical axis direction with respect to the CCD circuit 202. A shifting movement of the moving lens 201 causes a change in image formation on the CCD circuit. That is, focus adjustment is made by properly shifting the position of the moving lens 201.

The CCD circuit 202 serves as an image sensor for generating image data. The light receiving face of the CCD circuit 202 comprises a multiplicity of light receiving elements, each of which stores a certain amount of charge according to an intensity level of incident light. From each light receiving element, charge stored for a predetermined period of exposure time is read out to generate image data.

The CCD driver 203 supplies a timing pulse signal to the CCD circuit 202 to remove charge stored in each light receiving element. Further, under timing control conducted by the CCD driver 203, charge stored in each light receiving element is read out within the lapse of a predetermined period of exposure time. Image data generated by the CCD circuit 202 is fed to the signal amplifier 205 for amplification, and the resultant amplified image data is converted into digital signals by the A/D converter 206. Then, the digital signals of image data are input to the image processing section 207. In the image processing section 207, the digital image data is subjected to such a processing operation as zoom processing or compression processing. After processed by the image processing section 207, the image data is output to the control circuit 300.

The exposure control section 204 controls a period of exposure time in the CCD circuit 202 and a level of gain in the signal amplifier 205 according to exposure conditions instructed by the control circuit 300. The lens drive motor 208 is used to shift the moving lens 201 in the optical axis direction in response to a lens drive signal received from the control circuit 300.

The main display section 102 is an information display part for presenting characters and images. In the communication mode, the main display section 102 indicates phone call information such as a telephone number. Alternatively, in the camera mode, the main display section 102 is used as a monitor display panel for displaying an image fed from the camera section 200, i.e., the main display section 102 serves as a viewfinder equivalent to that of a digital still camera.

The image data memory section 106 is a memory part for storing image data of each scene taken through use of the camera section 200. The wireless communication section 107 is used to perform wireless communication for transmitting data to a wireless base station (not shown) and receiving data therefrom.

The control circuit 300 comprises a key operation detecting section 310, an AF (autofocus) control section 320, a microprocessor (CPU) 330, a display control section 340, an audio I/F section 350, and an image pickup processing section 360. The key operation detecting section 310 detects each keying by the user. In the key operation detecting section 310, a "half press" and a "full press" of the shutter button 104B are distinguishably detected. As used herein, the term "half press" denotes a user's shallow stroking action of pressing the shutter button 104B halfway down, and the term "full press" denotes a user's deep stroking action of pressing the shutter button 104B all the way down.

The AF control section 320 issues a lens drive signal to the camera section 200 for focus adjustment. In the camera mode, the camera section 200 outputs image data constantly. The image data that is constantly output from the camera section 200 is input to the AF control section 320 through the CPU 330. A "half press" of the shutter button 104B triggers the AF control section 320 to start the execution of autofocus control. Under the direction of the AF control section 320, the moving lens 201 in the camera section 200 is shifted in positioning for focus adjustment according to a level of contrast in image data. Referring to FIG. 3, there is shown a functional block configuration of the AF control section 320. The AF control section 320 comprises a face detecting section 321, a focus area setting section 322, a contrast calculating section 324, and a focus judging section 325.

The face detecting section 321 receives image data signals from the image processing section 207. In the face detecting section 321, a face region of pixels, i.e., a group of pixels receiving incident light corresponding to a subject person's face is detected from image data containing a multiplicity of pixels. Based on a known conventional method for person's face image recognition, a face region detecting operation is carried out through detection of skin color in the entire image concerned, through detection of feature points of the eyes, nose or mouth of a person's face in the image, through extraction of such a distinctive factor as a face profile from the image concerned, or through any combination thereof. If the result of face detection is successful, face position data corresponding to the face region detected is output to the focus area setting section 322. Alternatively, if a face region cannot be recognized in face detection processing by the face detecting section 321, i.e., if the result of face detection is unsuccessful, a face detection error signal indicating a failed attempt at face detection is issued to the focus area setting section 322.

Figure 15:
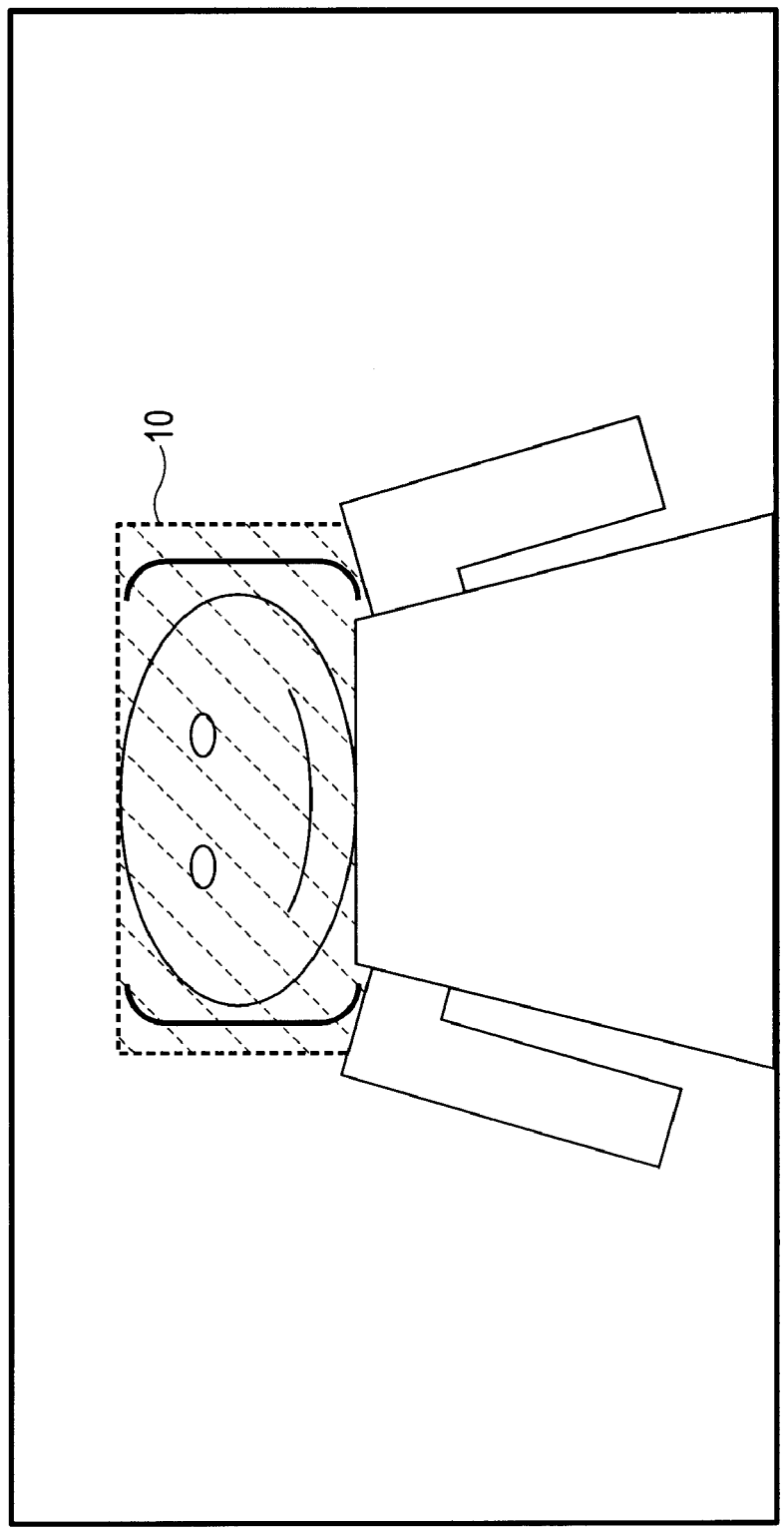
FIG. 15 is a diagram showing a state in which a face region is set up as a focus area in a conventional technique.

The focus area setting section 322 sets up a focus area for focus adjustment. When the focus area setting section 322 receives face position data from the face detecting section 321, the face region concerned is set up as a focus area according to the face position data received. Thus, the focus area including the face region is set up in a manner similar to that described hereinabove with reference to FIG. 15.

Figure 4:
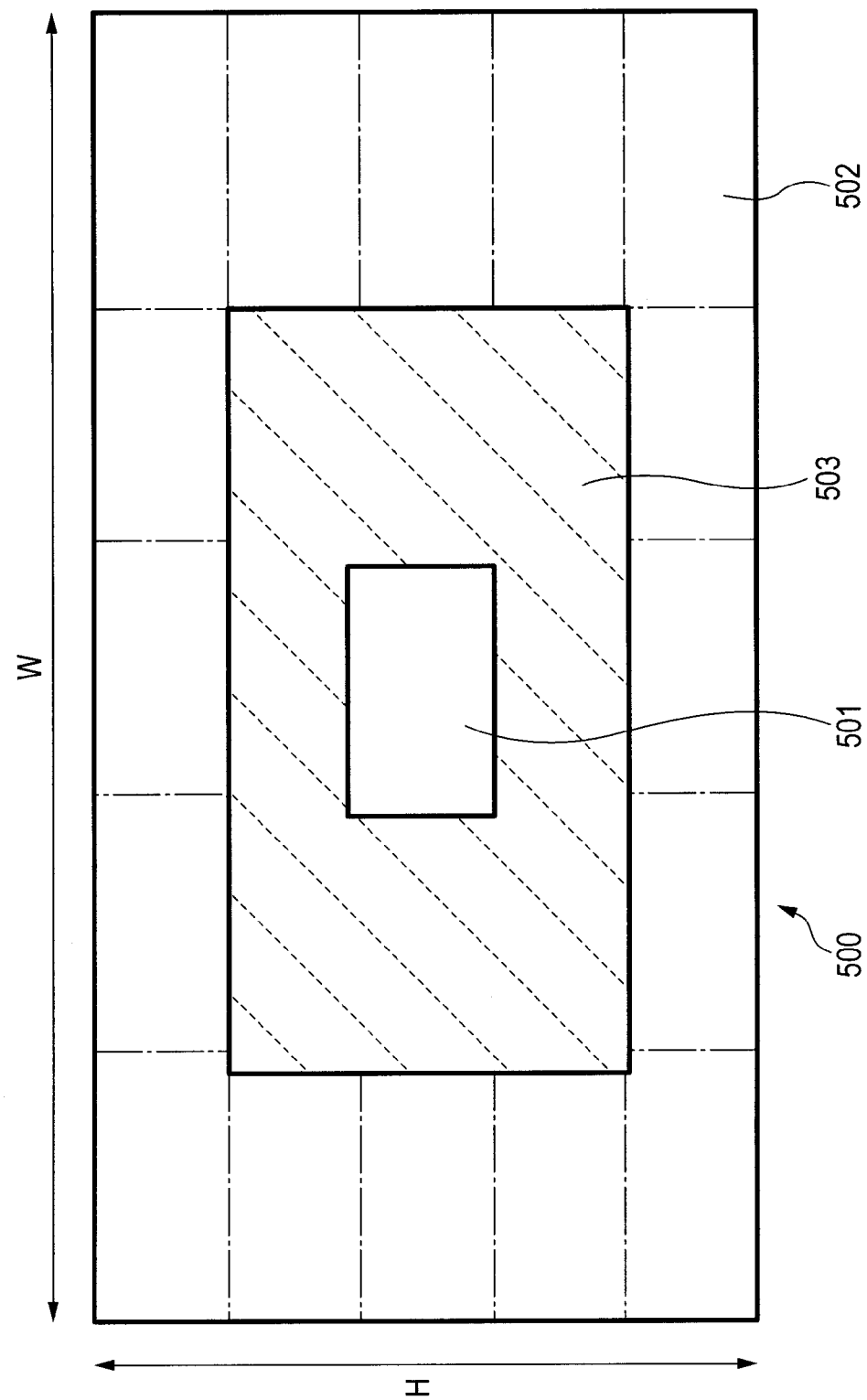
FIG. 4 is a diagram showing a preset focus area.

When the focus area setting section 322 receives a face detection error signal from the face detecting section 321, a preset focus area that has been predetermined for focus adjustment is established as a focus area. The focus area setting section 322 is provided with a preset area memory section 323. In the preset area memory section 323, there is stored data regarding a preset focus area 503 which is a rectangular ring-like region excluding a central region 501 and a peripheral region 502 from an image pickup area 500 as shown in FIG. 4. In the image pickup area 500 shown in FIG. 4, each of the width dimension W and height dimension H is divided into five equal parts. With the exclusion of the central region 501 and the peripheral region 502 from the image pickup area 500, there is provided a rectangular center-hollowed ring-like region corresponding to the preset focus area 503. On receipt of a face detection error signal from the face detecting section 321, the focus area setting section 322 reads out data regarding preset focus area conditions (e.g., coordinate data) from the preset area memory section 323, and then sets up a preset focus area according thereto.

The contrast calculating section 324 calculates a contrast value of a focus area that has been set up by the focus area setting section 322. The contrast value calculated by the contrast calculating section 324 is output to the focus judging section 325.

Figure 5:
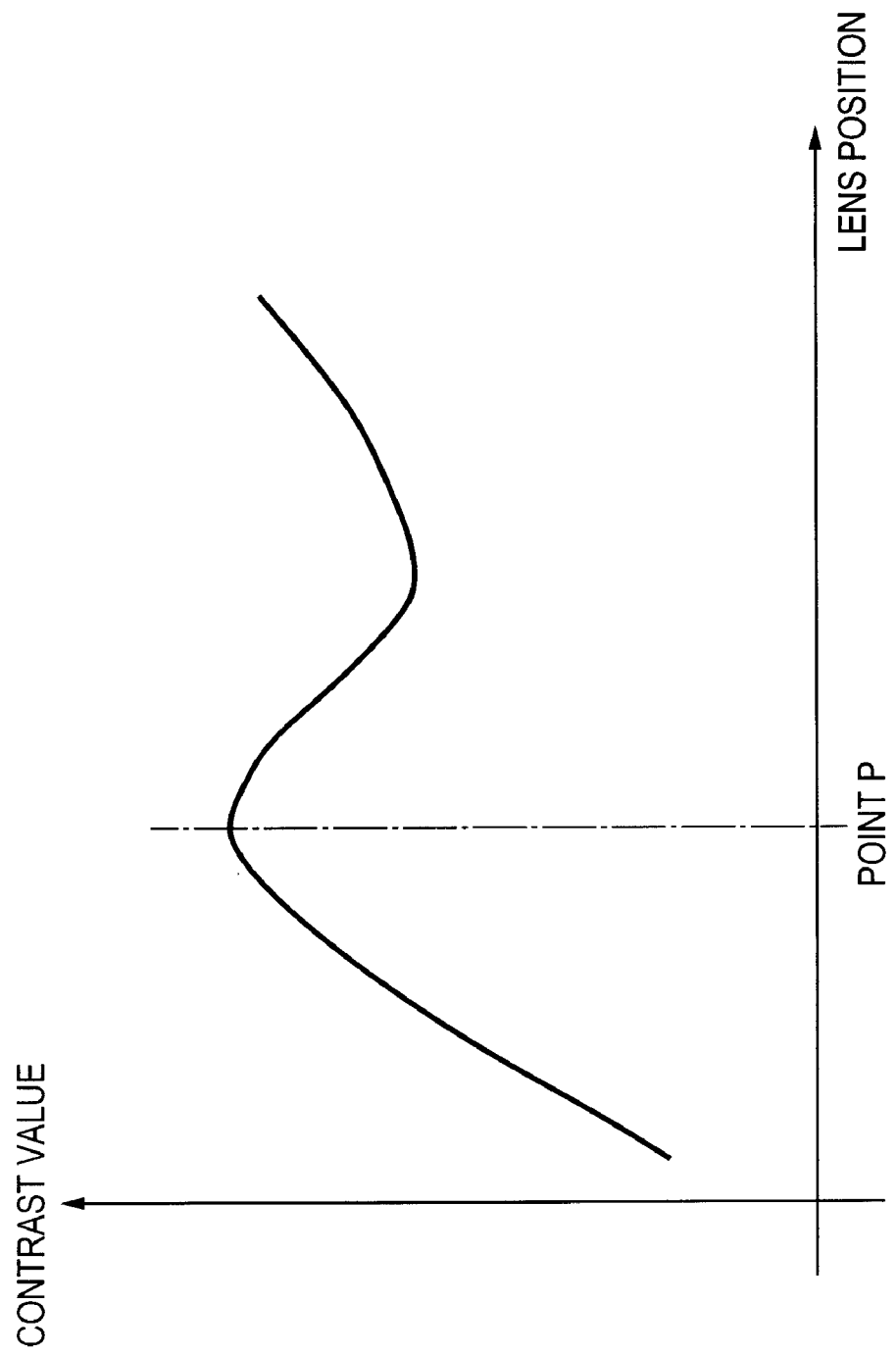
FIG. 5 is a graph showing an exemplary contrast curve.

The focus judging section 325 judges whether the contrast value is equal to the highest value (maximum value) or not. Based on this judgment, the moving lens 201 is adjusted in positioning so that the contrast value will become highest. More specifically, the moving lens 201 is shifted by applying a lens drive signal to the lens drive motor 208. At this step of operation, contrast value data varying with shifting movement of the moving lens 201 is sequentially acquired from the contrast calculating section 324. Thus, a moving lens position corresponding to the maximum contrast value is determined. In sequential acquisition of contrast value data while the moving lens 201 is shifted, a contrast curve is obtained as shown in FIG. 5, for example. In the graph shown in FIG. 5, when the moving lens 201 is set at point P, the contrast value becomes highest (maximum). Thus, it can be judged that the subject concerned is in focus at this lens position. Then, the focus judging section 325 applies a lens drive signal to the lens drive motor 208 to adjust the moving lens 201 to the point P where the subject concerned is in focus. When the in-focus state is reached, the user fully presses the shutter button 104B. Thus, the image data concerned is fed from the image processing section 207 to the image pickup processing section 360 through the CPU 330. Then, the image data is stored into the image data memory section 106 as required.

The display control section 340 performs display control for the main display section 102 and the sub-display section 105. In the camera mode, the camera section 200 outputs image data constantly. The image data that is constantly output from the camera section 200 is input to the display control section 340 through the CPU 330. Thus, the image data is displayed on the main display section 102. While checking a picture composition of the image data displayed on the main display section 102, the user fully presses the shutter button 104B to take the scene concerned.

A "full press" of the shutter button 104B triggers the image pickup processing section 360 to start the execution of a sequence of taking in image data from the camera section 200 and storing the image data into the image data memory section 106.

Figure 6:
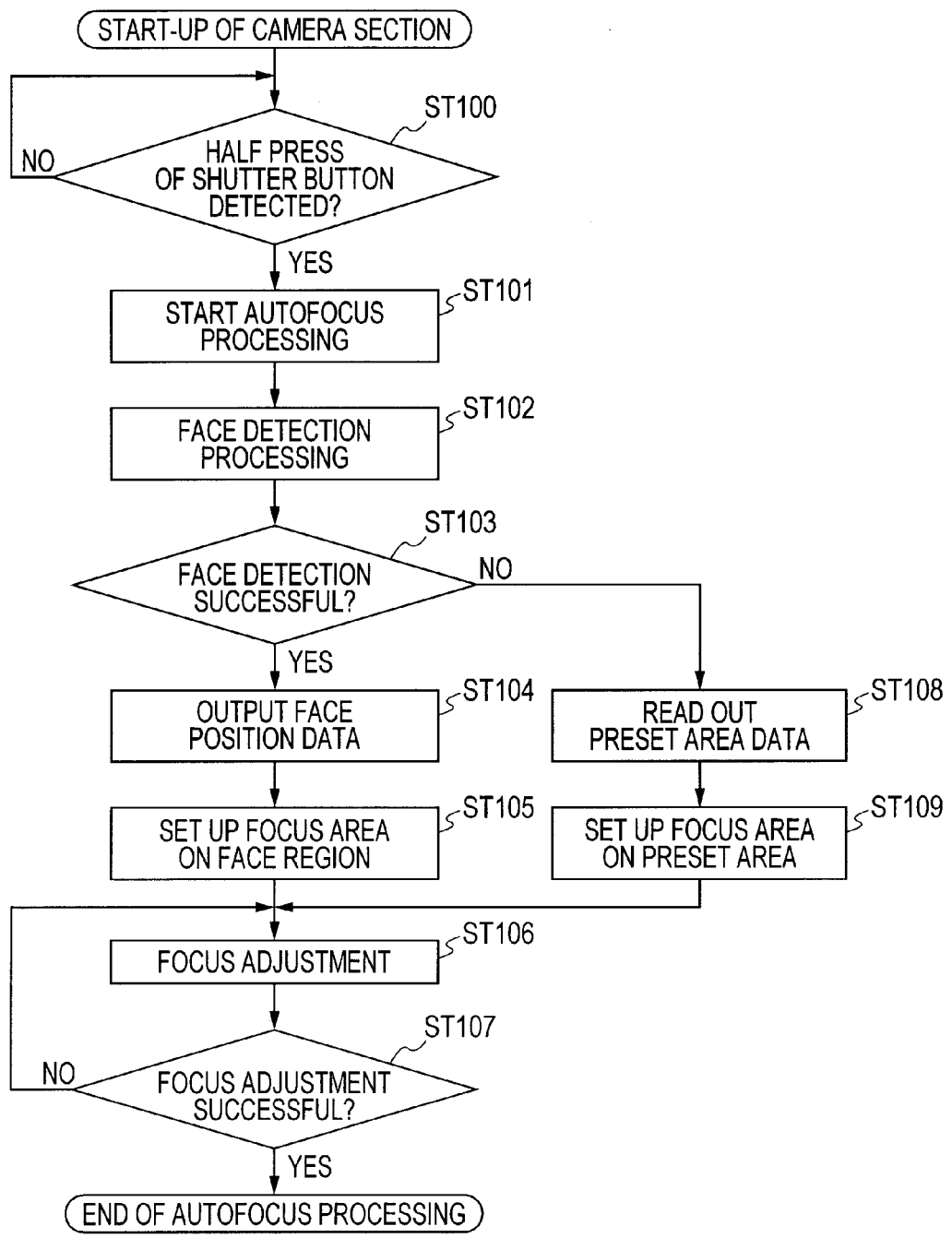
FIG. 6 is a flowchart showing an autofocus processing procedure according to a first exemplary embodiment of the present invention.

With reference to FIG. 6, the following explains autofocus processing in the camera-equipped mobile phone 100 that is configured as mentioned above.

First, when the user presses the camera mode key 104A, the camera section 200 is started up. On start-up of the camera section 200, an image formed on the CCD circuit 202 through the moving lens 201 is supplied as image data from the image processing section 207 to the control circuit 300. Then, under the direction of the display control section 340, the image data is displayed on the main display section 102.

While viewing the image data displayed on the main display section 102, the user orients the moving lens 201 to the subject of interest. Upon determining a picture composition, the user half-presses the shutter button 104B to trigger autofocus control. The half press of the shutter button 104B is detected by the key operation detecting section 310 (ST100). Then, under the direction of the CPU 330, the AF control section 320 is made active to start autofocus processing (ST101).

In the autofocus processing, face detection is carried out first (ST102). More specifically, in the image data concerned, a subject person's face image is detected by the face detecting section 321. In a case where the result of face detection is successful (ST103: YES), the face detecting section 321 outputs face position data to the focus area setting section 322 (ST104). Then, the focus area setting section 322 sets up a focus area 10 on the face position concerned (ST105) (refer to FIG. 15).

In the focus area 10 that has thus been set up on the face position, focus adjustment is carried out so as to provide a maximum contrast value (ST106). More specifically, while the moving lens 201 is shifted, contrast value data of the focus area 10 is sequentially acquired to determine a lens position corresponding to the maximum contrast value. By applying a lens drive signal to the lens drive motor 208, the moving lens 201 is adjusted to an in-focus position.

If the result of focus adjustment is successful (ST107: YES), the autofocus processing comes to an end. When the user fully presses the shutter button 104B in this state, the image data concerned is captured. Thus, the image data with the subject person's face being in focus can be obtained.

In a case where the result of face detection is unsuccessful (ST103: NO), the face detecting section 321 issues a face detection error signal to the focus area setting section 322. Then, the focus area setting section 322 establishes the preset focus area 503 that has been stored in the preset area memory section 323 (refer to FIG. 4). More specifically, the focus area setting section 322 reads out data regarding the preset area 503 from the preset area memory section 323 (ST108). Thus, the preset area 503 is established as a focus area. That is, a rectangular ring-like region excluding the central region 501 and the peripheral region 502 is set up as the preset area 503 (refer to FIG. 4).

In the preset focus area 503 that has thus been set up, focus adjustment is carried out so as to provide a maximum contrast value (ST106). Upon successful completion of focus adjustment (ST107), the user fully presses the shutter button 104B to capture the image data concerned. Thus, the image data with the subject in the preset focus area being in focus can be obtained.

Then, the following describes advantageous effects of the first exemplary embodiment of the present invention.

In the present exemplary embodiment, the preset area 503 shown in FIG. 4 is stored in the preset area memory section 323. On occurrence of a failure in face detection, focus adjustment is carried out so that a contrast value of the preset area 503 will be maximized. In this case, only the preset area 503 is subjected to contrast value calculation. Hence, in the event of a failure in face detection, focus adjustment can be accomplished in a shorter period of time than that required in a conventional technique wherein an in-focus lens position is acquired for each of a plurality of focus areas.

Further, in the present exemplary embodiment, the preset area 503 is provided in the form of a rectangular ring-like region excluding the central region 501 and the peripheral region 502 as shown in FIG. 4. Hence, even in case of a failure in face detection, the subject of interest in shooting can be brought into focus properly. This advantageous effect is described below.

Figure 7:
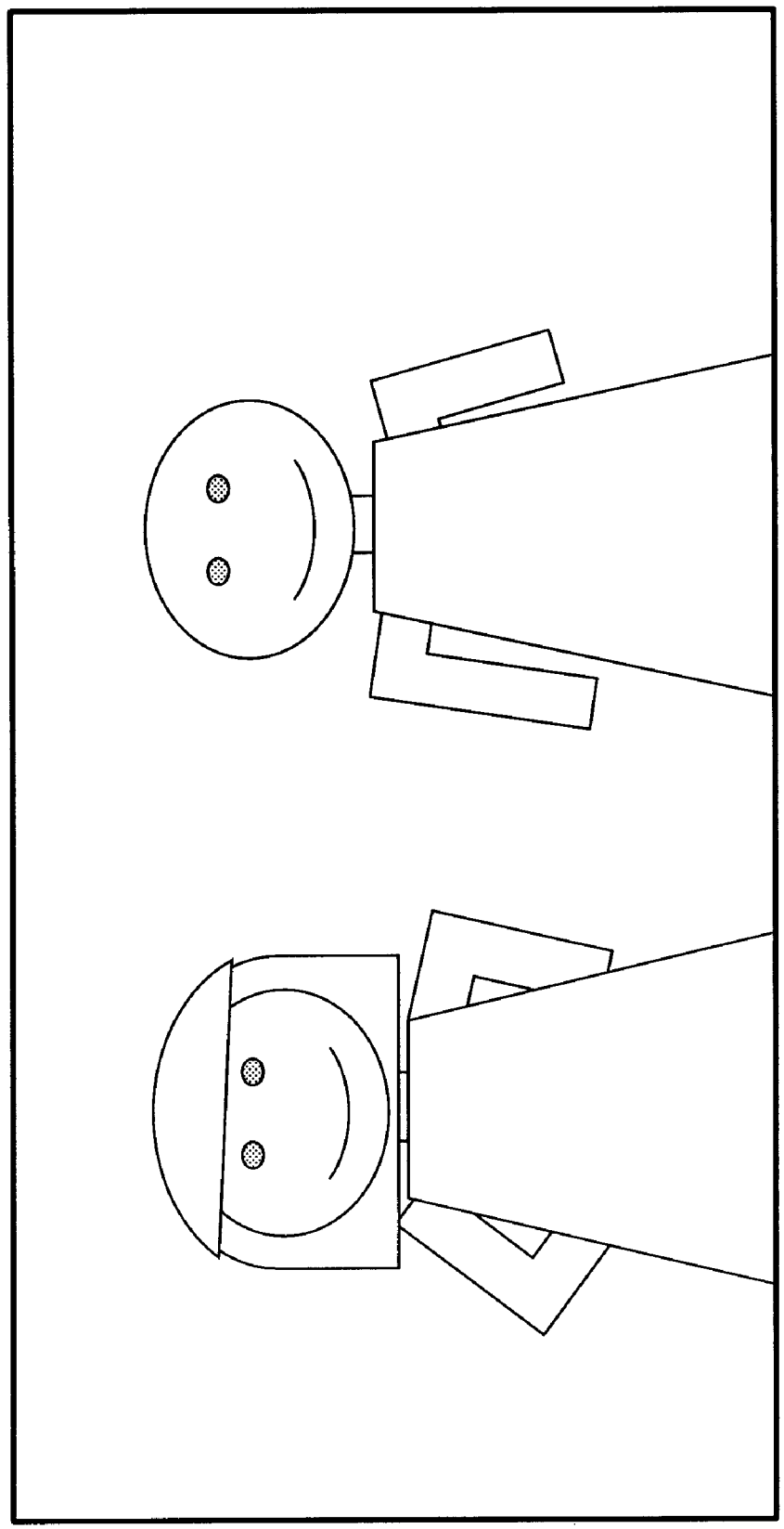
FIG. 7 is a diagram showing a scene where two persons are standing side by side.
Figure 16:
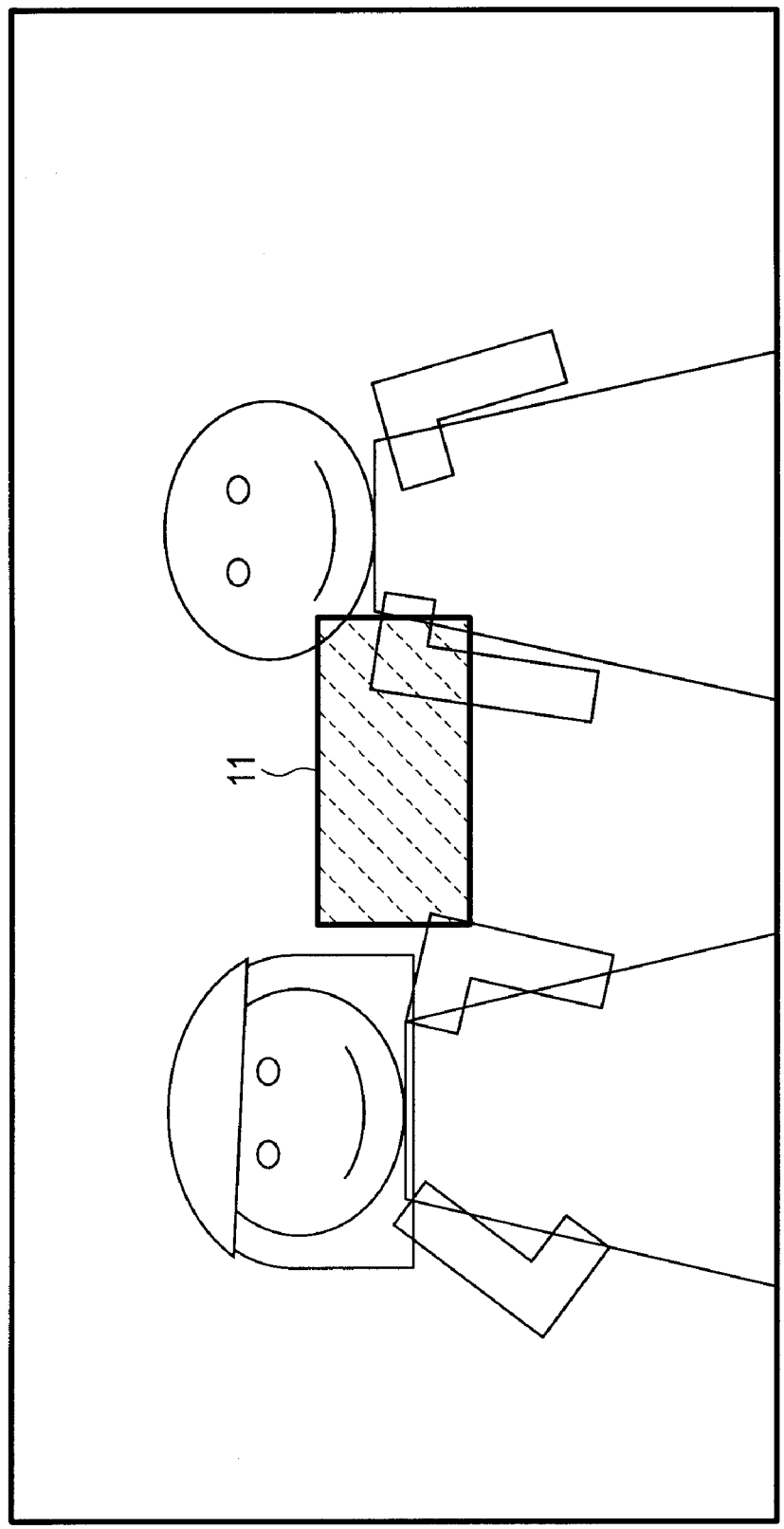
FIG. 16 is a diagram showing a state in which a central region of an image pickup area is set up as focus area in a conventional technique.
Figure 18A:
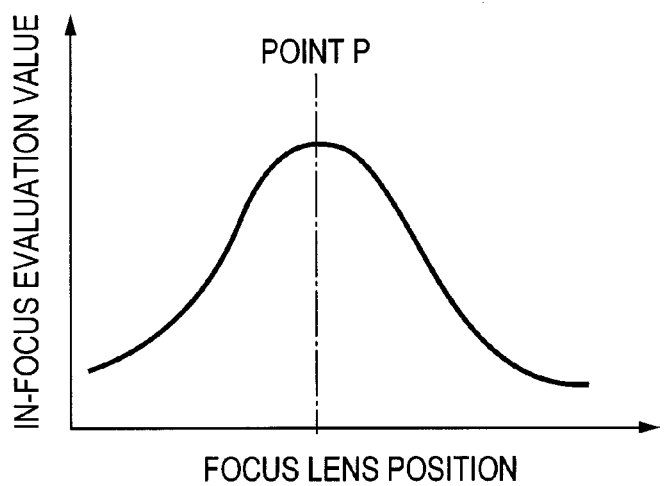
FIGS. 18A, 18B, and 18C are graphs showing variations in data of in-focus evaluation values corresponding to the focus areas illustrated in FIG. 17, in which FIG. 18A indicates a peak of contrast at a lens position of focusing on a subject person M1, FIG. 18B indicates a peak of contrast at a lens position of focusing on a distant background, and FIG. 18C indicates a peak of contrast at a lens position of focusing on a subject person M2.
Figure 18B:
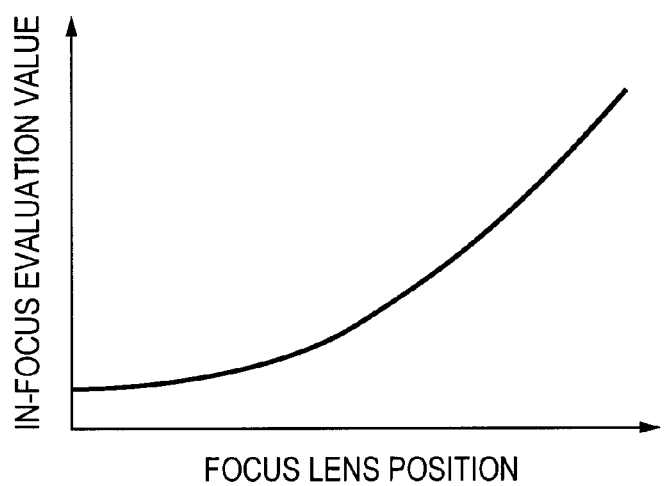
Figure 18C:
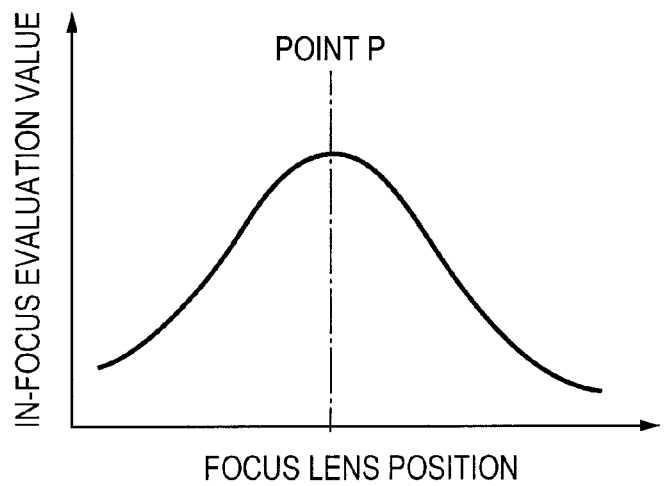

For example, in a scene where two persons are standing side by side as shown in FIG. 7, if focus adjustment is carried out based on only a contrast value of a central region 11 as illustrated in FIG. 16, a distant background is brought into focus while the subject persons of interest are out of focus. Hence, a failure in face detection will result in blurry imaging.

Figure 8:
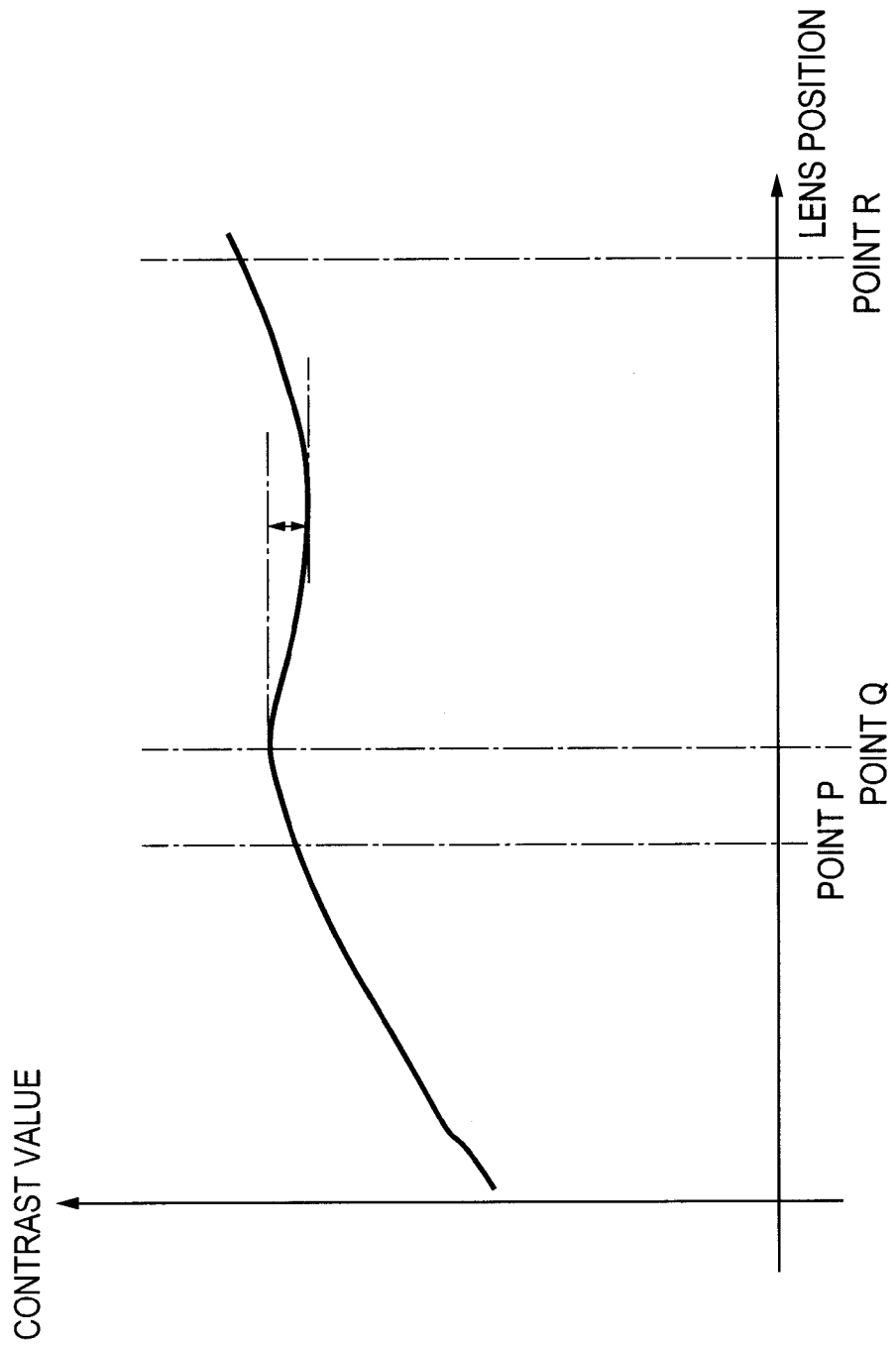
FIG. 8 is a graph showing another exemplary contrast curve.

As another example of focus adjustment, it is conceivable that the entire image pickup area may be used as a focus area to apply a maximum contrast value thereof to focusing. However, in this case, proper focus adjustment will not be made frequently due to significant influence of images other than the subject persons in a scene. In the scene exemplified in FIG. 7 where two persons are standing side by side, the background region behind the subject persons is considerably large, i.e., the background region occupies a majority proportion of the entire image pickup area. An exemplary contrast curve obtained by shifting the moving lens 201 in this case is drawn in FIG. 8, wherein the leading slope thereof to the maximum contrast value (peak) is gentle and also the trailing slope thereof is gentle due to significant influence of the background. Hence, there is a high degree of probability that point P corresponding to the in-focus position of the subject persons will not be recognized as a lens position of the maximum contrast value, thus resulting in lens position adjustment to point R where a distant point is in focus. Further, due to influence of distant images, the contrast value may be maximized at a point that is slightly posterior to the point P corresponding to the in-focus position of the subject persons. In such a case, even if the peak of the contrast curve is recognized properly, it is difficult to bring the subject persons into focus.

Figure 9:
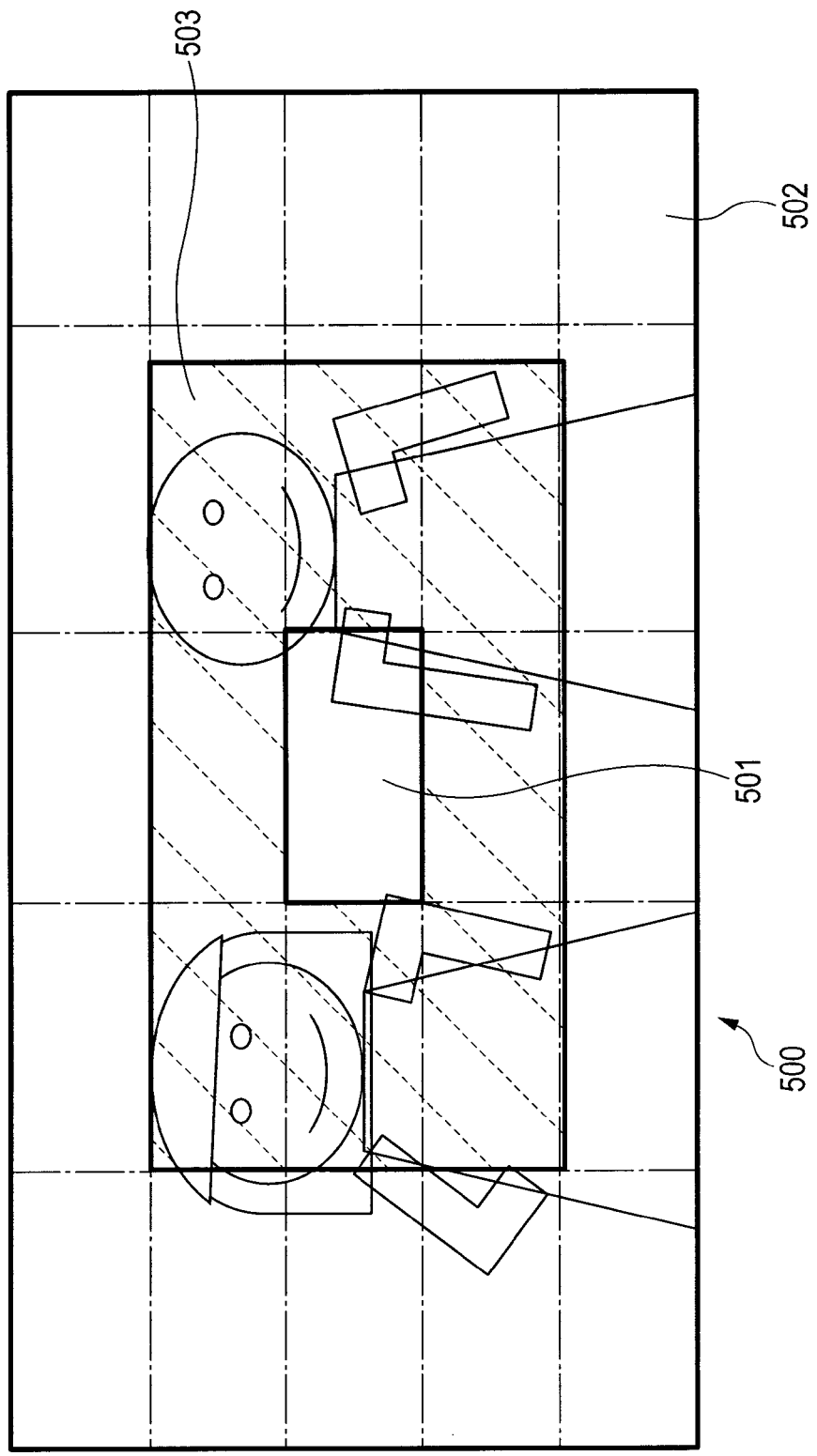
FIG. 9 is a diagram showing a state in which a scene of two persons standing side by side is taken by using a preset focus area.

To overcome these disadvantages, the present exemplary embodiment provides the preset area 503 as a focus area in the form of a rectangular ring-like region excluding the central region 501 and the peripheral region 502 as shown in FIG. 4. Thus, as illustrated in FIG. 9, a majority proportion of the focus area 503 is occupied by the images of the subject persons. An exemplary contrast curve obtained by shifting the moving lens 201 in this case is shown in FIG. 5, wherein the maximum contrast value is indicated distinctly at an in-focus lens position of the subject persons of interest in shooting on account of the condition that there is no or little influence of the background. Thus, it is possible to form a picture image with the subject persons being in focus.

In conventional techniques, there is a problem that blurry imaging is likely to occur in case of a failure in face detection. According to the present exemplary embodiment, the preset area 503 illustrated in FIG. 4 is used in case of a failure in face detection instead of using only the central region or the entire image pickup area as a focus area. Hence, even if the result of face detection is unsuccessful, it is possible to obtain image data with the subject person(s) being in focus. Since just one focus area is used, focus adjustment can be accomplished in a relatively short period of time.

Figure 10:
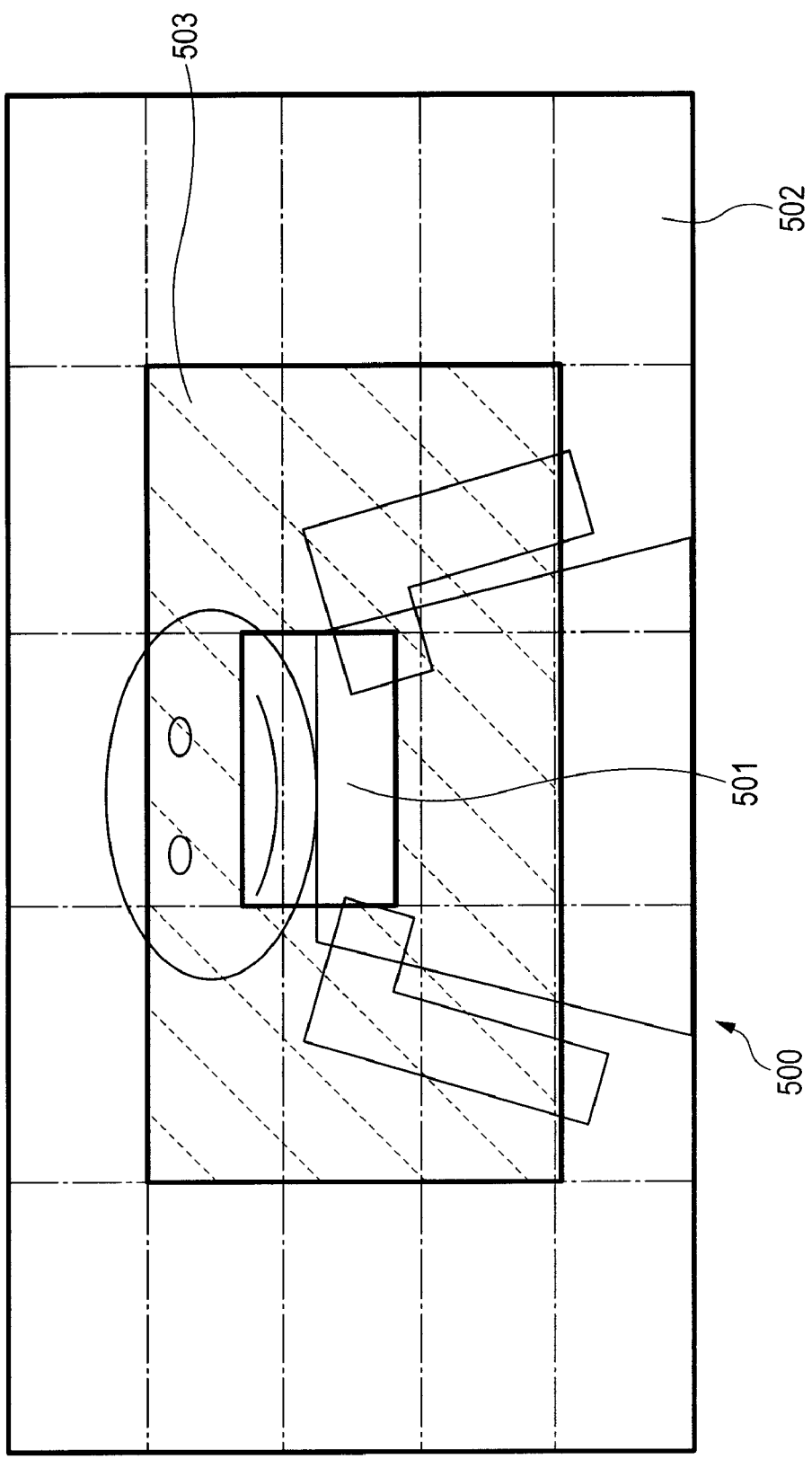
FIG. 10 is a diagram showing a state in which a scene of a person standing alone is taken by using a preset focus area.

In a situation where a picture of only one person is taken, it is conceivable that focus adjust may be made with higher accuracy by using only the central region as a focus area. However, if only the central region is set up as a focus area, proper focusing cannot be carried out at the time of shooting a scene of two persons standing side by side. Contrastingly, in the present exemplary embodiment wherein the preset area 503 is set as a focus area, even when a picture of only one subject person is taken as exemplified in FIG. 10, a majority proportion of the focus area 503 is occupied by the image of the subject person. Hence, a picture image with the subject person being in focus can be formed.

As described above, by setting the preset area 503 as a focus area according to the present exemplary embodiment, it is possible to carry out proper focus adjustment for substantially any subject or subjects of interest in shooting.

In a situation where a picture of distant scenery is taken, the focus area shown in FIG. 4 can cover substantially any scenic subject of interest. That is, in landscape picture taking, it is also possible to obtain a properly focused picture image by using the focus area shown in FIG. 4.

Thus, according to the present exemplary embodiment, a picture image with the subject(s) of interest being in focus can be formed in a short time period of focus adjustment even in case of a failure in face detection.

In the preset focus area arrangement, the image pickup area 500 is divided in a grid-like pattern, and the central region 501 and the peripheral region 502 are excluded to provide the preset focus area 503. Thus, the preset focus area 503 is formed of rectangular blocks. The rectangular formation of the preset area 503 makes it possible to facilitate contrast value calculation processing.

There may also be provided preset focus areas formed as described below.

According to the present exemplary embodiment mentioned above, each of the width dimension W and height dimension H of the image pickup area 500 is divided into five equal parts, and with the exclusion of the central region 501 and the peripheral region 502, a rectangular center-hollowed ring-like region is provided as the preset focus area 503. In extractive formation of the preset focus area 503 from the image pickup area 500, it is preferable that the size of the central region 501 to be excluded should be at least $1/25$ of the image pickup area 500. That is, the central region 501 should have at least the size of a central block formed by dividing each of the width dimension W and height dimension H of the image pickup area 500 into five equal parts. This formation is the same as that shown in FIG. 4.

Figure 11:
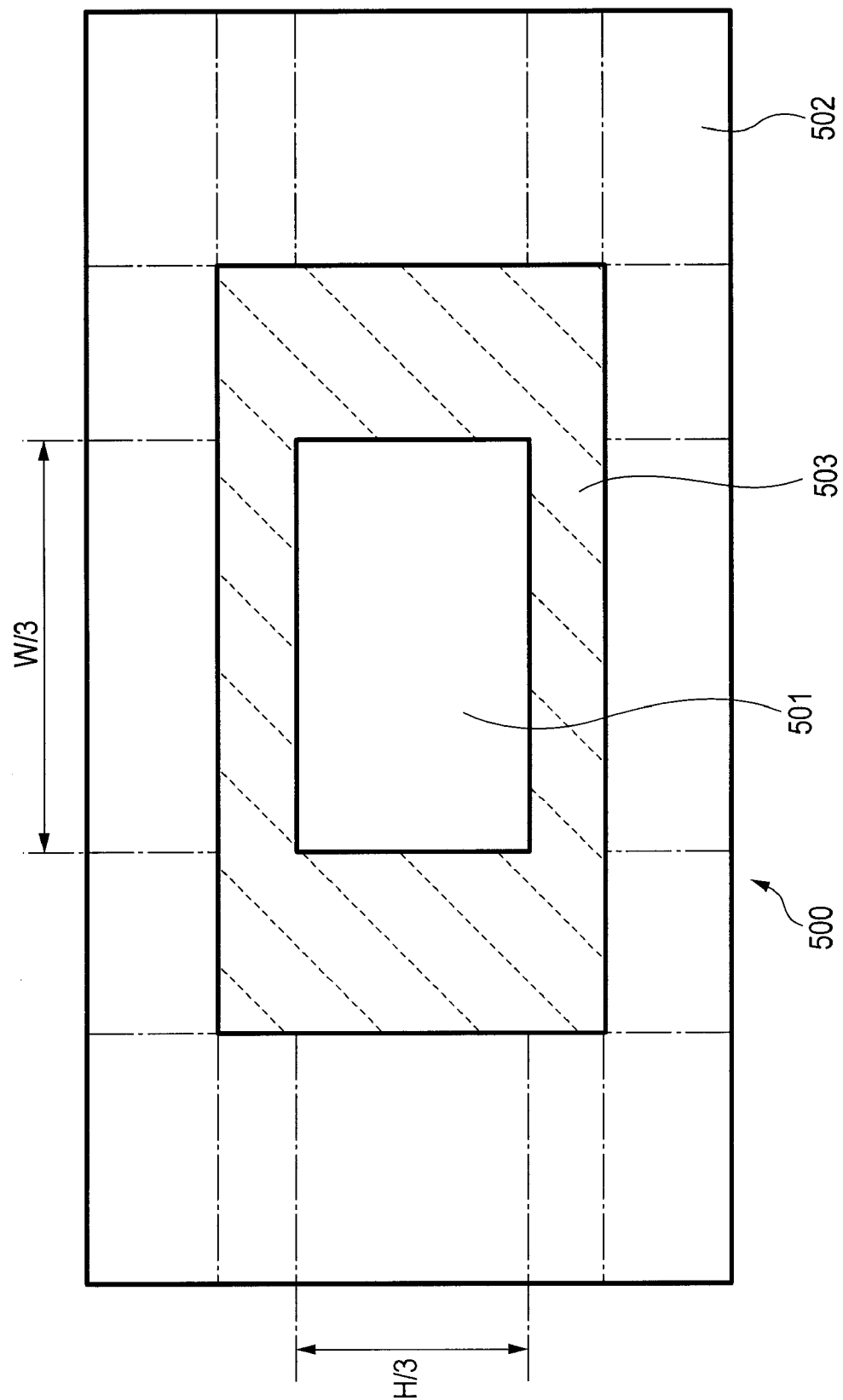
FIG. 11 is a diagram showing a modification of a preset area.

Further, it is preferable that the size of the central region 501 to be excluded should not exceed $1/9$ of the image pickup area 500 as shown in FIG. 11. That is, the central region 501 should have a size not exceeding that of a central block formed by dividing each of the width dimension W and height dimension H of the image pickup area 500 into three equal parts. (Refer to FIG. 11.)

Regarding the peripheral region 502 to be excluded from the image pickup area 500, it is preferable that the size of the peripheral region 502 should be at least $16/25$ of the image pickup area 500. That is, the peripheral region 502 should have at least the size of a peripheral frame-like portion formed by dividing each of the width dimension W and height dimension H of the image pickup area 500 into five equal parts. This formation is the same as that shown in FIG. 4.

Figure 12:
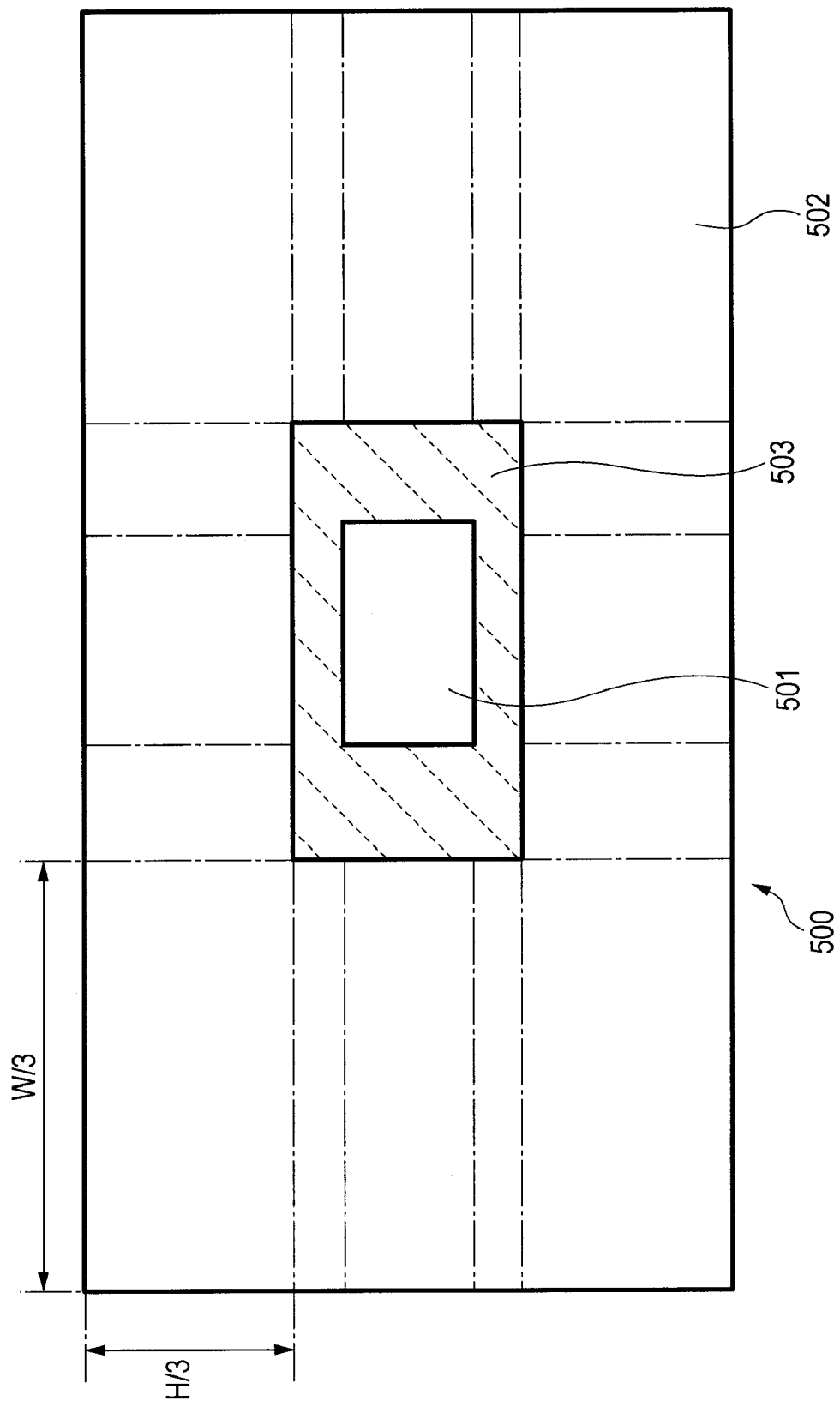
FIG. 12 is a diagram showing another modification of a preset area.

Still further, it is preferable that the size of the peripheral region 502 to be excluded should not exceed $1/9$ of the image pickup area 500 as shown in FIG. 12. That is, the peripheral region 502 should have a size not exceeding that of a peripheral frame-like portion formed by dividing each of the width dimension W and height dimension H of the image pickup area 500 into three equal parts. (Refer to FIG. 12.)

In the exemplary preset focus area formations mentioned above, the preset focus area is provided by excluding the central region and the peripheral region from the image pickup area. Alternatively, the preset focus area may be provided by excluding only the central region from the image pickup area. In this arrangement, at time of taking a scene of two persons standing side by side, it is also possible to prevent problematic blurry imaging due to influence of distant images viewed between the two persons.

More advantageously, the peripheral region should also be excluded from the image pickup area along with the central region. Since it is presumable that the subject of interest in shooting is rarely positioned in the peripheral region of the image pickup area, more accurate focusing can be made on the subject of interest by using the preset focus area excluding both the peripheral region and the central region.

Figure 13:
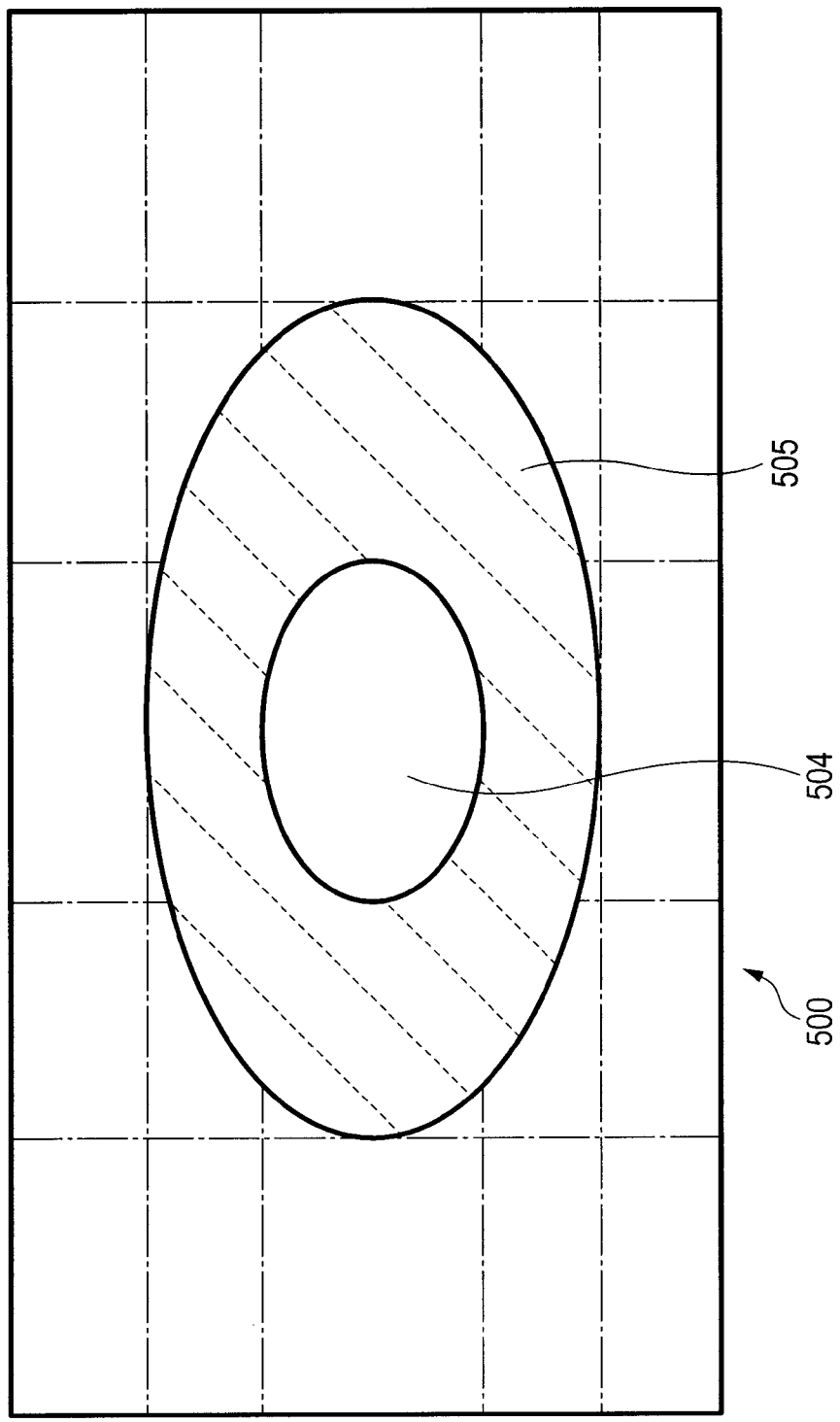
FIG. 13 is a diagram showing still another modification of a preset area.

While the preset focus areas each having a rectangular ring-like shape have been exemplified above, there may also be provided a preset focus area 505 which is a circular or elliptical ring-like region excluding a circular or elliptical central region 504 and a peripheral region from an image pickup area 500 as shown in FIG. 13, for example.

Second Exemplary Embodiment

Figure 14:
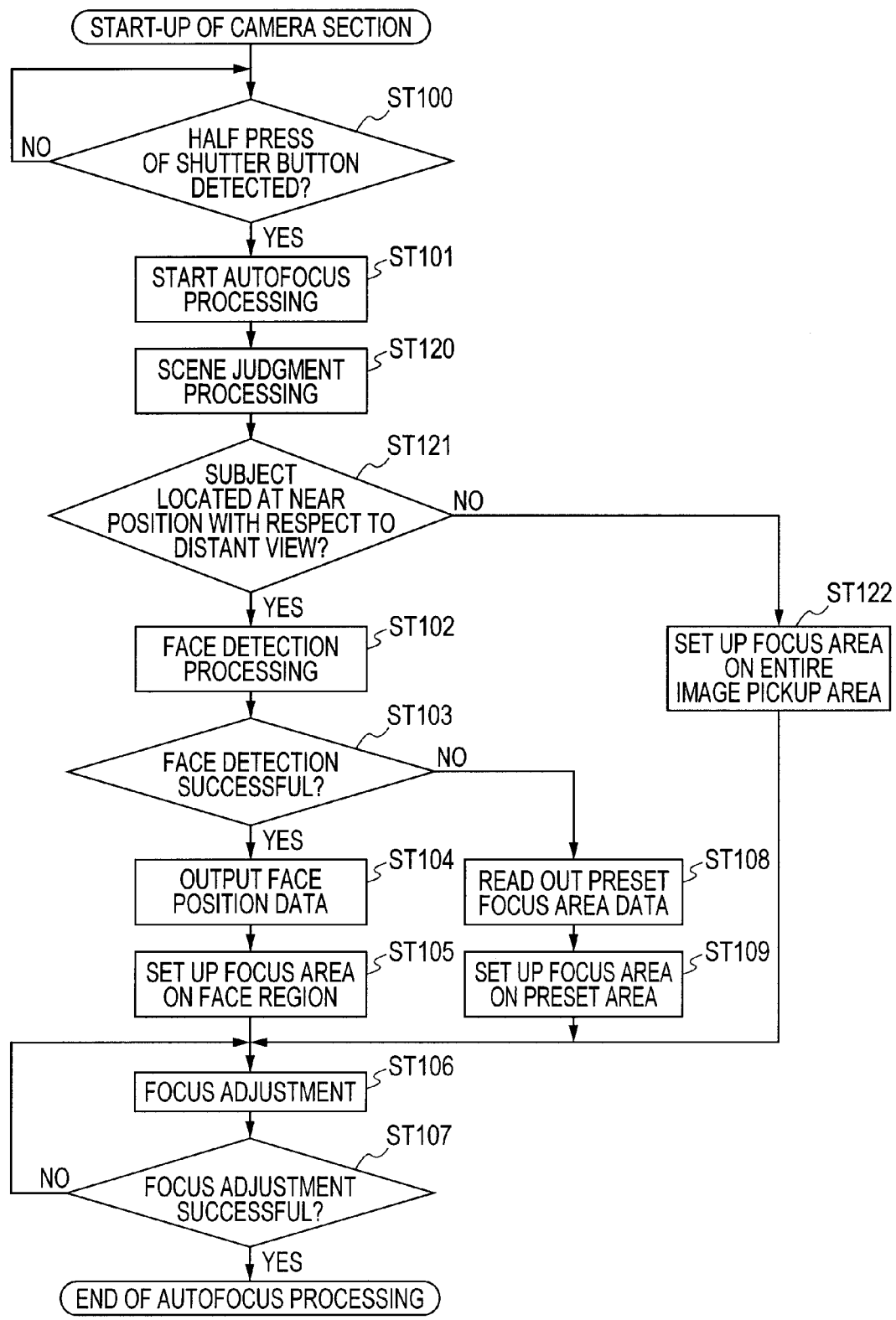
FIG. 14 is a flowchart showing an autofocus processing procedure according to a second exemplary embodiment of the present invention.

The following describes a second exemplary embodiment of the present invention. The basic arrangements of the second exemplary embodiment are similar to those of the first exemplary embodiment described above. In the second exemplary embodiment, there is further provided a scene judgment processing function, differently from the case of the first exemplary embodiment. FIG. 14 shows a flowchart of autofocus processing according to the second exemplary embodiment. In the second exemplary embodiment, after autofocus processing is started (ST101), scene judgment processing is carried out (ST120). With an existing technique, it is possible to implement a scene judgment processing function with which a judgment is formed on whether or not the subject of interest is located at a near position with respect to the distant view concerned. In execution of the scene judgment processing (ST120), if it is judged that the subject of interest is located at a near position with respect to the distant view concerned (ST121: YES), control goes to face detection processing. Then, steps ST102 to ST109 are carried out in the same manner as that in the first exemplary embodiment.

Alternatively, in execution of the scene judgment processing (ST120), if it is judged that the subject of interest is not located at a near position with respect to the distant view concerned (ST121: NO), the focus area is set up on the entire image pickup area. In most of the instances where it is judged that the subject of interest is not located at a near position with respect to the distant view concerned, the entire image pickup area can be presumed to be the subject of interest. In these instances, focus adjustment that provides optimal contrast on the entire image pickup area will practically meet the user's intention of shooting. On the entire image pickup area, focus adjustment is performed (ST106). Then, if the result of focus adjustment is successful (ST107: YES), the autofocus processing comes to an end.

In the arrangement mentioned above, even when the subject of interest is not located at a near position, i.e., the subject of interest is a distant view, automatic focus adjustment can be carried out properly to meet the user's intention of shooting in terms of practical application.

While the present invention has been described in detail with respect to specific embodiments thereof, it is to be understood that the present invention is not limited by any of the details of description and that various changes and modifications may be made in the present invention without departing from the spirit and scope thereof.

For example, while face detection is performed in the first and second exemplary embodiments described above, there may be provided an arrangement including no face detecting function. That is, in execution of autofocus processing, focus adjustment may be performed based on the preset focus area under any shooting condition. Alternatively, in a situation where it is recognized in scene judgment that the subject of interest is not located in a distant view, focus adjustment may be performed based on the preset focus area unexceptionally. In such an arrangement as mentioned above, a period of time to be taken from the start of face detection until the recognition of unsuccessful face detection in the first exemplary embodiment is eliminated, i.e., a period of time required for focus adjustment is shortened further. Moreover, in taking a picture of one subject person, two or more subject persons, or a distant view, it is possible to carry out proper focus adjustment for clear subject imaging in practical application.

It is to be understood that an image pickup component is not limited to a CCD circuit and that a CMOS sensor or any other type of image sensor may be applicable as an image pickup component in the present invention. Further, it will be obvious to those skilled in the art that a small type of electronic device incorporating a camera section according to the present invention is not limited to a mobile phone, i.e., the present invention is applicable to such electronic devices as a handheld game device, a PDA (personal digital assistant) terminal, and a portable music player. Still further, while autofocus processing is started by half-pressing the shutter button in the exemplary embodiments exemplified hereinabove, it is to be appreciated that such an operational step or sequence may be arranged appropriately in accordance with design specifications of each small-type electronic device in application of the present invention.

What is claimed is:

1. An autofocus control method for adjusting a position of a lens to bring the subject of interest into focus, comprising the steps of:

providing an arrangement wherein a ring-like region excluding a central region from an image pickup area is set up as a preset focus area for judgment of the degree of in-focus;

acquiring an image signal through the lens and an image pickup part;

calculating, based on the image signal thus acquired, a contrast value indicating the degree of in-focus of the preset focus area;

determining a lens position corresponding to a maximum contrast value as an in-focus lens position;

wherein, after autofocus processing is started, scene judgment is carried out to check whether or not the subject of interest is located at a near position with respect to a distant view;

wherein, if the result of scene judgment indicates that the subject of interest is not located at a near position with respect to the distant view concerned, the entire image pickup area is set up as a focus area, and focus adjustment is performed based thereon; and wherein, if the result of scene judgment indicates that the subject of interest is located at a near position with respect to the distant view concerned, focus adjustment is performed based on the preset focus area.

2. The autofocus control method according to claim 1, wherein the size of the central region is at least 1/25 of the entire image pickup area.

3. The autofocus control method according to claim 1, wherein the size of the central region does not exceed 1/9 of the entire image pickup area.

4. The autofocus control method according to claim 1, wherein the preset focus area is a region excluding a peripheral region along with the central region from the image pickup area.

5. The autofocus control method according to claim 4, wherein the peripheral region has at least the size of a peripheral frame-like portion formed by dividing each of the width and height dimensions of the image pickup area into five equal parts.

6. The autofocus control method according to claim 4, wherein the peripheral region has a size not exceeding that of peripheral frame-like portion formed by dividing the width and height dimensions of the image pickup area into three equal parts.

7. The autofocus control method according to claim 1, wherein, in execution of autofocus processing, focus adjustment is performed based on the preset focus area under any shooting condition.

8. The autofocus control method according to claim 1, wherein, after autofocus processing is started, face detection is carried out;

wherein, if the result of face detection is successful, a face region is set up as a focus area, and focus adjustment is performed based thereon; and wherein, if the result of face detection is unsuccessful, focus adjustment is performed based on the preset focus area.

9. The autofocus control method according to claim 1, wherein, if the result of scene judgment indicates that the subject of interest is located at a near position with respect to the distant view concerned, face detection is carried out;

wherein, if the result of face detection is unsuccessful, focus adjustment is performed based on the preset focus area; and wherein, if the result of face detection is successful, a face region is set up as a focus area, and focus adjustment is performed based thereon.

* * * * *